April 3, 1951  P. C. MORRIS  2,547,593
CONTROL MECHANISM FOR MOTOR VEHICLES
Filed Oct. 21, 1949  4 Sheets-Sheet 1
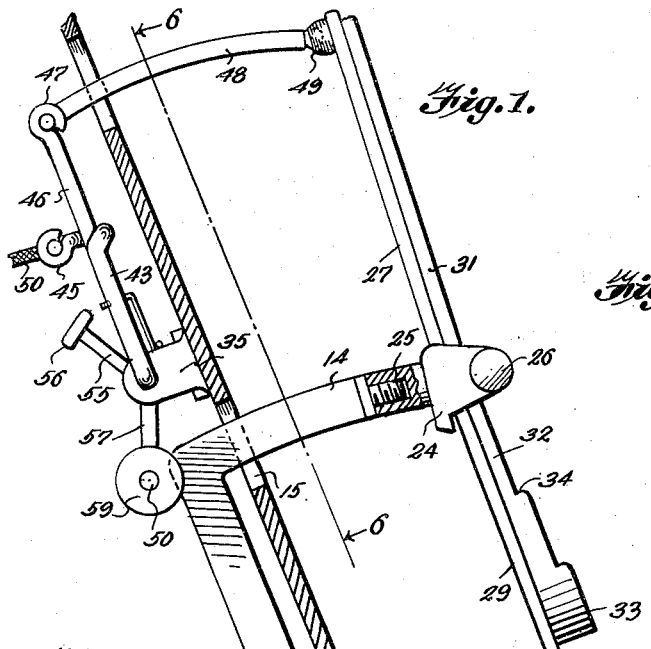
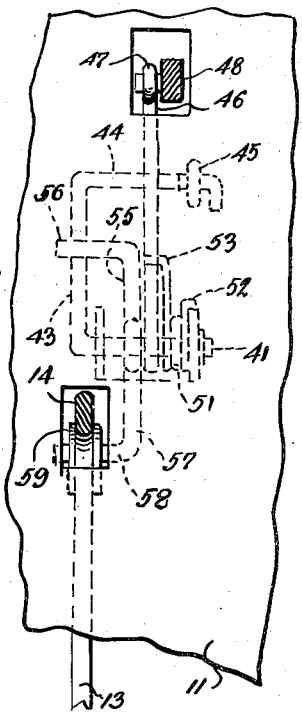
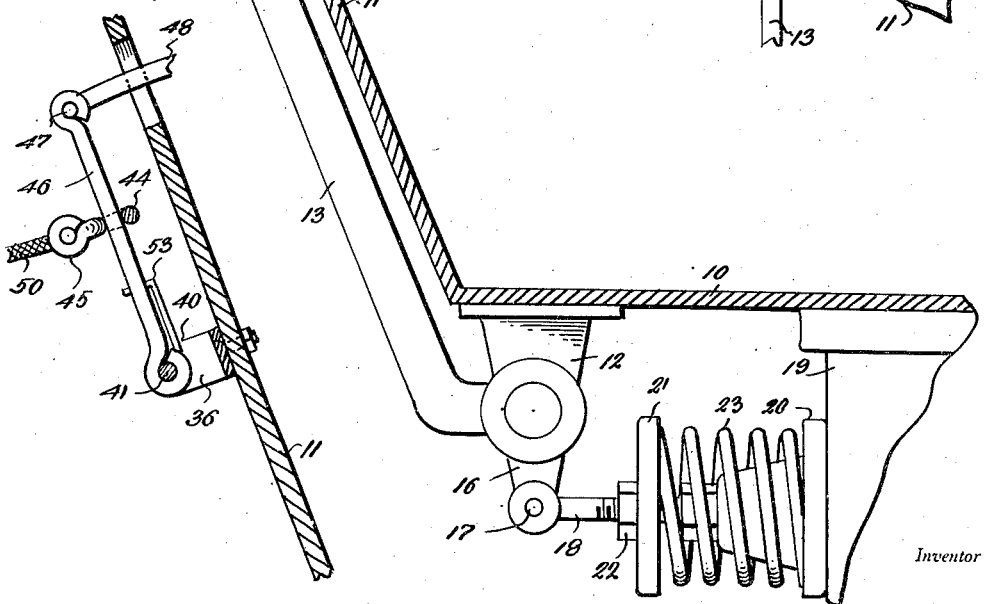
Inventor
PAUL C. MORRIS
By Patrick J. Beavers
Attorney April 3, 1951 P. C. MORRIS 2,547,593
CONTROL MECHANISM FOR MOTOR VEHICLES
Filed Oct. 21, 1949 4 Sheets-Sheet 2
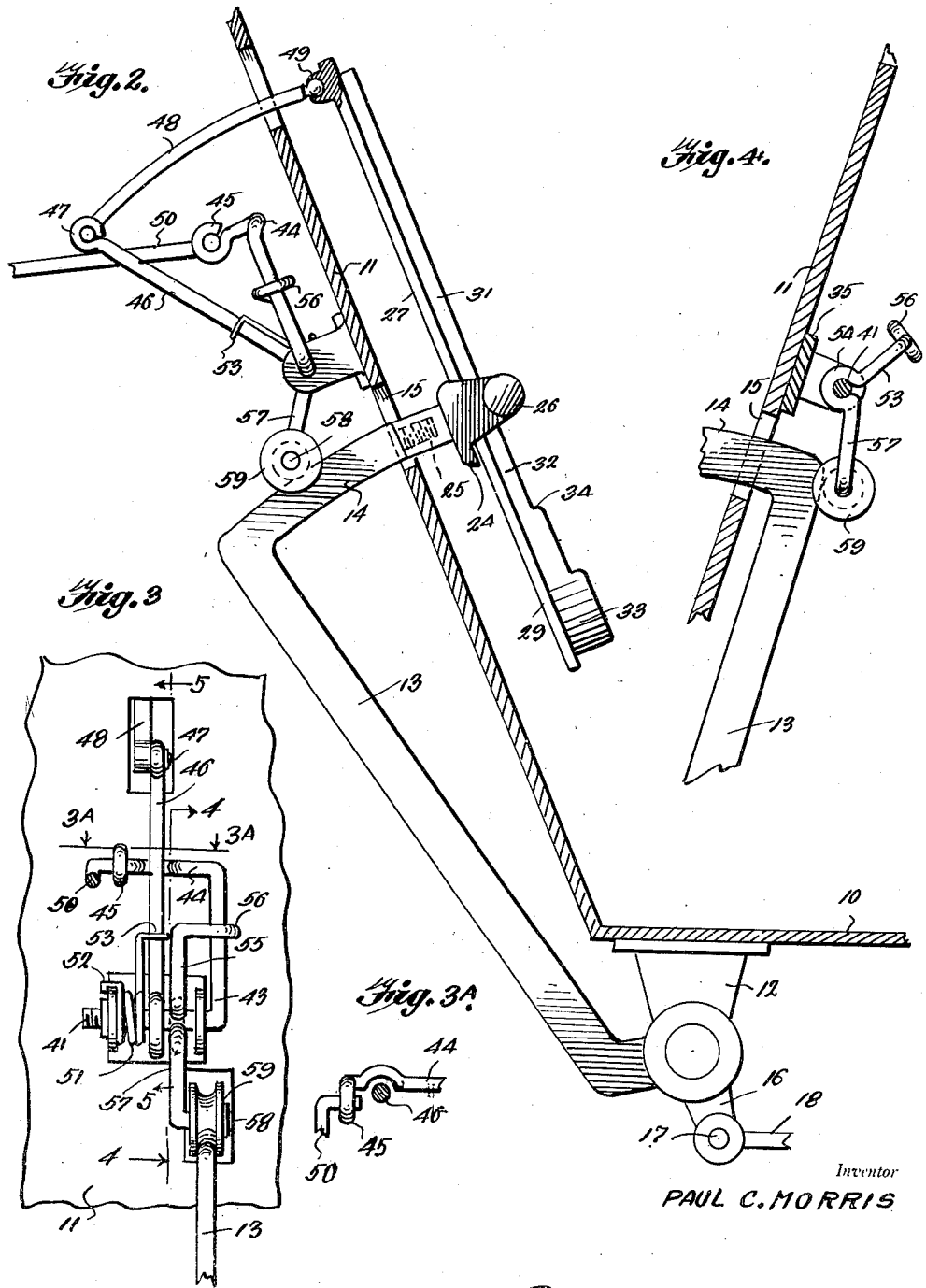
Inventor
PAUL C. MORRIS
By Patrick D. Beavers
Attorney April 3, 1951     P. C. MORRIS     2,547,593
CONTROL MECHANISM FOR MOTOR VEHICLES
Filed Oct. 21, 1949     4 Sheets-Sheet 3
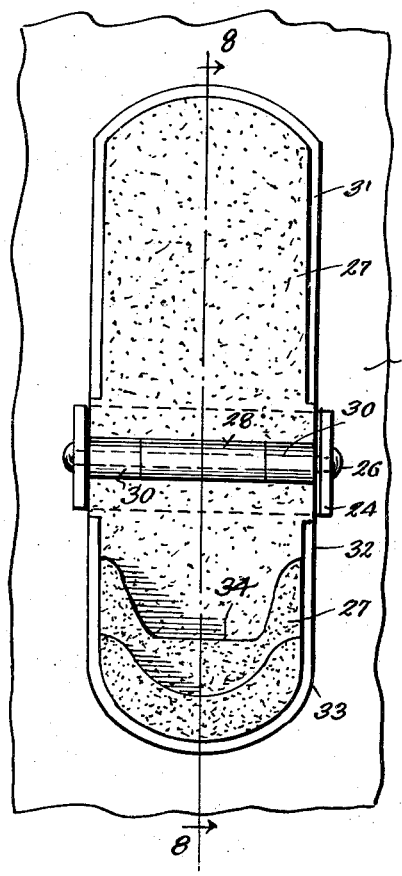
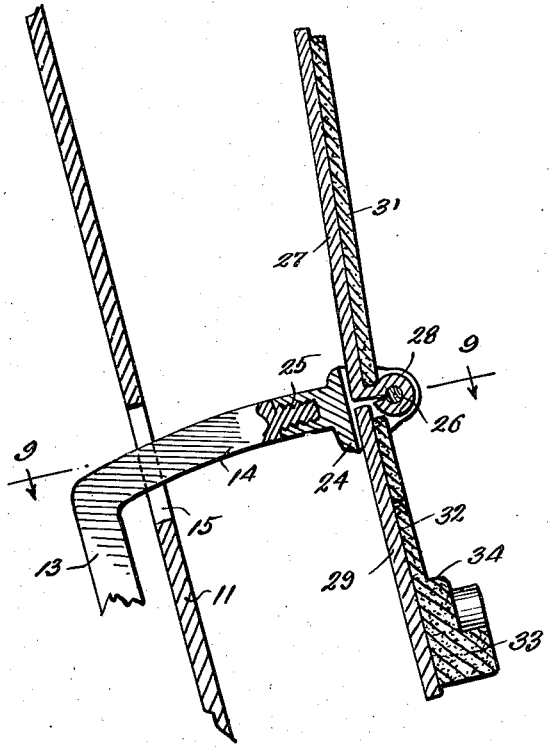
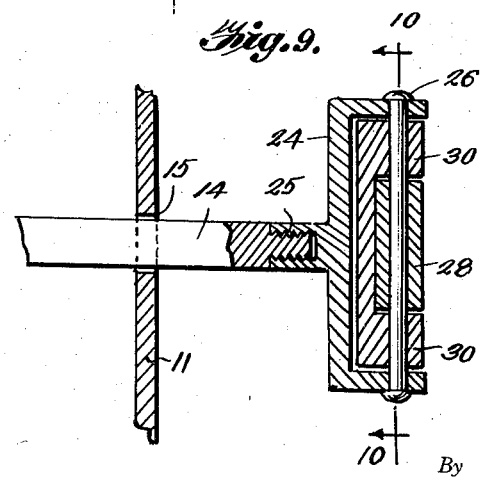
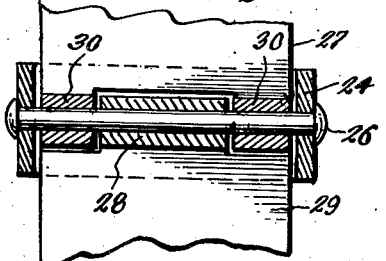
Inventor
PAUL C. MORRIS
By *Patrick D. Beavers*
Attorney

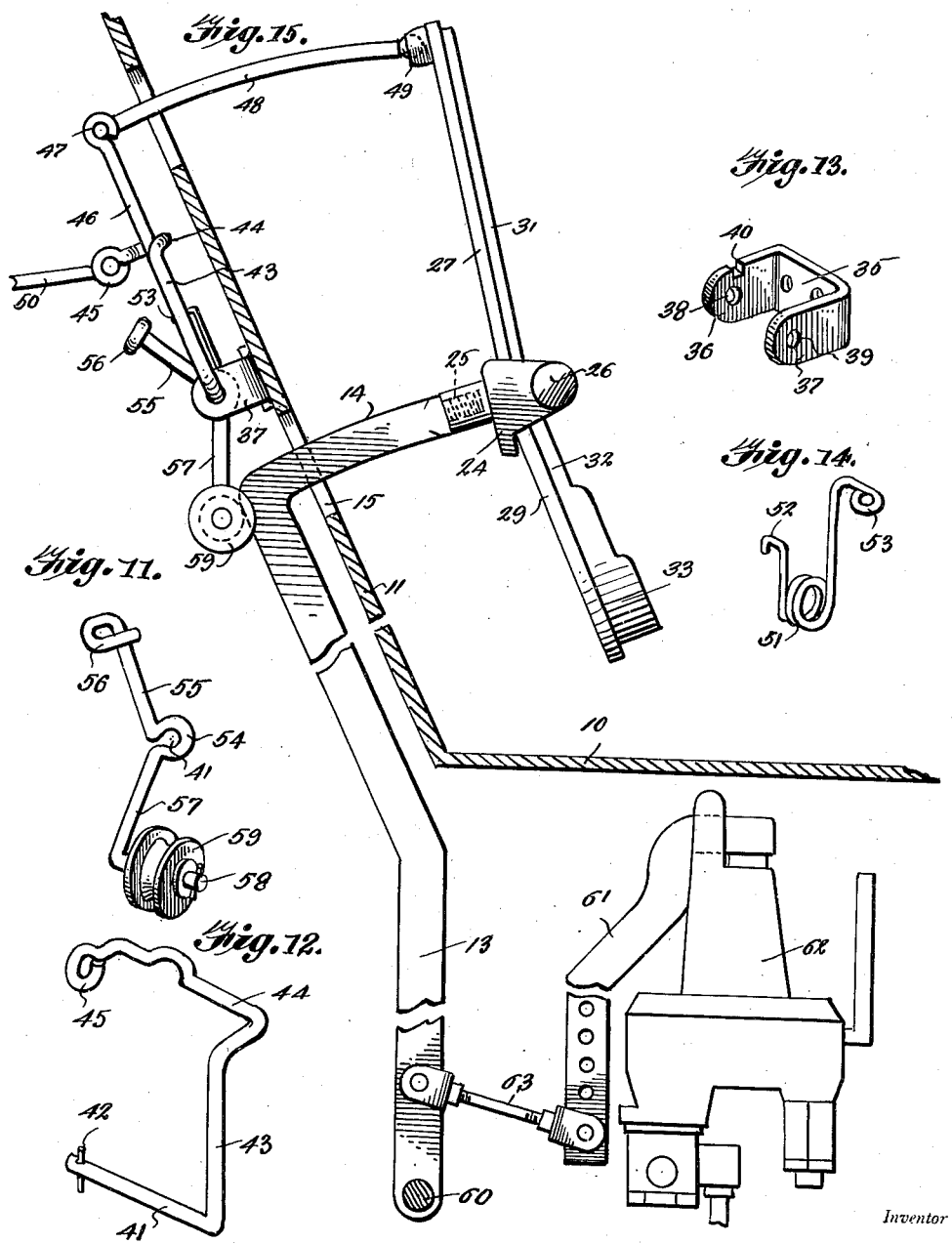

Patented Apr. 3, 1951

2,547,593

UNITED STATES PATENT OFFICE 2,547,593

CONTROL MECHANISM FOR MOTOR VEHICLES

Paul C. Morris, Louisville, Ky.

Application October 21, 1949, Serial No. 122,757

2 Claims. (Cl. 192—3)

The present invention relates to control mechanism for motor vehicles and it consists in the combinations, constructions and arrangements of parts herein described and claimed.

Generally, the invention comprises a yoke secured to the outer end of the conventional brake pedal and to which yoke is a downwardly extending pivotally connected brake pedal and an upwardly extending pivotally connected accelerator pedal. That portion of the brake pedal which extends through the floor boards of the vehicle is at all points of equal radius from the pivotal point of the brake lever. To the rear of the floor boards there is affixed a bracket upon which is pivotally connected a throttle lever which is, in turn, pivotally connected with a throttle rod which finally connects with the butterfly valve of the carburetor of the engine. The upper end of the throttle lever encircles the rearward portion of an accelerator rod lever whose upper end is pivotally connected with the forward end of an accelerator rod whose rearward end, in turn, is pivotally connected to the under side of the accelerator pedal. The butterfly valve is provided with a comparatively weak spring which normally urges the same toward full throttle condition. Hence, forward movement of the accelerator pedal will allow this weak spring to move the accelerator rod lever forwardly. A throttle return lever whose upper end is adapted to encircle the forward portion of the accelerator rod lever is also pivotally mounted upon the bracket and has a portion which extends downwardly and terminates in a roller which normally engages the upwardly extending portion of the brake pedal but which is adapted to be moved forwardly and upwardly by the forward movement of the brake pedal to thereafter rest upon the upper portion of the inwardly extending arm of the brake pedal and to thereby bear against the accelerator rod lever to thereby overcome the action of the comparatively weak butterfly spring and thereby return the condition of the engine to idling speed. It will be apparent that the device is capable of use with but one foot of the operator and may be so placed as to be convenient to either of the operator's feet. A forward movement of the operator's toe will cause acceleration of the vehicle while a forward movement of the entire foot of the operator will cause the brakes to be engaged and the throttle to be automatically returned to idling condition. Other features will become apparent in the specification herebelow.

It is accordingly an object of the invention to provide a device of the character set forth which is simple in operation, inexpensive to manufacture and yet efficient and effective in use.

Another object of the invention is the provision of a device of the character set forth which will eliminate the so-called "reaction period," that is to say the normal time elapsing between removing the operator's foot from the conventional accelerator pedal and placing the same upon the brake pedal.

Another object of the invention is to simplify the control mechanisms of a motor vehicle.

A further object of the invention is the provision of a device of the character set forth which will allow simplified control of a motor vehicle when the same is being held upon a hill or a ramp while the engine is in operation.

Another object of the invention is the provision of a device of the character set forth which provides means whereby faster starting and quicker stopping means is provided.

A further object of the invention is the provision of a device of the character set forth which provides means whereby smoother acceleration and deceleration may be had at all speed ranges thereby saving wear upon tires, wear and tear upon other portions of the vehicle and a saving of fuel and lubricating oil.

A still further object of the invention is the provision, in a device of the character set forth, of automatic means for returning a motor to idling condition when the brake pedal is moved to brake-engaging position.

A still further object of the invention is the provision of a device of the character set forth in which means is provided making it impossible to "ride" the brake of the vehicle.

Other and further objects of the invention will become apparent from a reading of the following specification taken in conjunction with the drawings, in which:

Figure 1 is a side elevational view of an embodiment of the invention,

Figure 2 is a view similar to Figure 1 but showing the brake pedal moved forwardly to engaged position, Figure 3 is a fragmentary reduced elevational view of the rear of the device shown in Figures 1 and 2, Figure 3A is a sectional view taken along line 3A—3A of Figure 3, Figure 4 is an enlarged sectional view taken along line 4—4 of Figure 3, Figure 5 is an enlarged fragmentary sectional view taken along line 5—5 of Figure 3, Figure 6 is a sectional view taken along line 6—6 of Figure 1, Figure 7 is a plan view of certain pedals forming a part of the invention, Figure 8 is a sectional view taken along line 8—8 of Figure 7, Figure 9 is a fragmentary sectional view taken along line 9—9 of Figure 8, Figure 10 is a sectional view taken along line 10—10 of Figure 9, Figures 11 to 14, inclusive, are perspective detailed views of certain elements of the invention, and Figure 15 is a view similar to Figure 1 but showing a slight modification the invention may assume.

Referring more particularly to the drawings, there is shown therein the floor boards of a vehicle having the conventional horizontal portion 10 and the conventional upwardly and forwardly sloping portion 11. A dependent bracket 12 is affixed to the underside of the portion 10 of the floor boards to which is pivotally connected a brake pedal lever 13 which extends upwardly and forwardly and which is provided with a rearwardly extending integrally formed arcuate portion 14 at its upper end which portion extends through a slot 15 formed in the floor boards portion 11. The lever 13 is provided with an integrally formed downwardly extending arm 16 which is pivotally connected, as indicated at 17, to the free end of a brake cylinder rod 18 which extends into the conventional brake cylinder 19.

A brake spring retainer 20 surrounds the rod 18 adjacent the master cylinder 19 and a brake return spring retainer 21 is positioned upon the rod 18 in spaced relation to the retainer 20 and is held against forward movement by an adjustably mounted nut 22 which is threaded upon the rod 18. A compression spring 23 surrounds the rod 18 and is adapted to bear against the retainers 20 and 21.

The arm 14 is, as stated, arcuate in shape and it is to be noted that the radius of the arc is identical at all points, centering upon the pivotal point of the lever 13.

A yoke 24 is threadably connected to the outer end of the arm 14, as indicated at 25, and a hinge pin 26 interconnects the arms of the yoke.

An upwardly extending accelerator pedal 27 is provided with a centrally disposed pintle 28 which is revolubly mounted upon the pin 26. A downwardly extending brake pedal 29 is provided with a pair of pintles 30 which are likewise revolubly mounted upon the pin 26. It will be seen that the base of the yoke 24 provides a limiting means for the movement of the pedals 27 and 29, that is to say both pedals are limited as to movement beyond a right angular relation to the plane of the yoke 24 but are not limited in their rearward movement with respect to the yoke.

The pedal 27 is provided with a coating or covering of rubber or the like, as indicated at 31, and a like covering of rubber or the like is provided for the pedal 29, as indicated at 32. The lower end of the covering 32 is raised in the contour of the rear of a man's heel, as indicated at 33 and upwardly from the portion 33 there is provided a thickened portion which provides a shoulder 34 for the reception of a woman's heel.

A lever mounting bracket 35, preferably formed of a single piece of material, is attached to the underside of the portion 11 of the floor boards immediately above the opening 15. The bracket 35 is provided with a pair of outwardly extending arms 36 and 37 which are provided with circular openings 38 and 39, respectively and the arm 36 is provided with a notch 40 in its upper side.

In Figure 12 is shown what may be termed a throttle lever and it is provided with an axle portion 41 which extends through the openings 38 and 39 and is locked therein by means of a cotter pin 42 or the like. The axle has integrally formed therewith an upwardly extending portion 43 at the upper end of which is integrally formed a substantially U-shaped rearwardly extending portion 44 which terminates in a forwardly extending eye 45.

Pivotally mounted at its lower end upon the axle 41 is a throttle lever 46 to the upper end of which is pivotally connected, as indicated at 47, the forward end of an accelerator rod 48 whose rearward end is pivotally connected to the underside of the upper end of the pedal 27, as indicated at 49.

The rear end of a throttle rod 50 is connected to the eye 45 and at its forward end (not shown) is connected to a conventional butterfly valve of a carburetor which butterfly valve is normally held in open position by means of a relatively weak spring to maintain the engine of the vehicle in "full throttle" condition.

In Figure 14 is shown an accelerator return spring which is provided with a coil 51 which surrounds the axle 41 and one end of which extends upwardly and terminates in a hook 52 which is adapted to engage in the notch 40 and the other end of which extends upwardly and terminates in a loop 53 which is adapted to surround the accelerator rod 48.

In Figure 11 there is shown a throttle return lever which is centrally provided with a looped portion 54 which is pivotally mounted upon the axle 41 and has an integrally formed upwardly extending arm 55 which terminates in a forwardly extending U-shaped portion 56 and which is also provided with an integrally formed downwardly extending arm 57 which has integrally formed therewith a laterally extending portion 58 upon which is mounted a roller 59.

In the operation of this form of the invention it will be apparent that the operator's foot is so placed upon the pedals 27 and 29 that the sole of the operator's foot lies upon the pad 31 of the pedal 27 while the operator's heel lies upon the pad 32 of the pedal 29. Forward movement of the operator's sole will cause the pedal 29 to move forwardly and at the same time, due to the fact that the abutting ends of the pedals 27 and 29 come together, the pedal 29 will be moved in a rearward direction. Forward movement of the pedal 27 will cause the accelerator rod 48 and hence the accelerator rod lever 46 to move forwardly thus allowing the butterfly valve spring to move the rod 50 forwardly and consequently allow additional fuel to the engine to thereby accelerate the movement of the same. Release of the pedal 27 will cause a reversal of these movements due to the fact that the spring 51 is purposely formed relatively stronger than the butterfly spring of the valve.

Braking is accomplished by pressing the pedals 27 and 29 simultaneously forwardly thus causing the lever 13 to move forwardly and as a result thereof the dependant arm 16 to move rearwardly thereby operating the master cylinder 19 of the braking system. The tension of the brake return spring 23 may be adjusted to suit conditions by properly placing the nut 22 upon the rod 18. As the lever 13 moves forwardly, the roller 59 and the arm 57 are moved forwardly and upwardly, the roller 59 thus passing to a position atop the arm 14. When the arm 14 comes into engagement with the roller 59, no further movement of the arm 57 will take place.

It will likewise be seen that the forward movement of the brake lever 13, moving as it does the arm 57 forwardly and upwardly, will likewise move the arm 55 and consequently the U-shaped member 56 rearwardly thus causing the throttle lever 43 to move rearwardly and thus returning the motor to its idling condition automatically. When the brake lever 13 is released by releasing the pressure of the operator's foot upon the pedals 27 and 29, the weight of the roller 59 will cause the arm 57 to again move downwardly and rearwardly and consequently the arm 55 and the U-shaped member 56 at the top thereof to move forwardly thus releasing any pressure upon the throttle lever 43.

In Figure 15 there is shown a slight modification of the invention wherein all of the parts above described are identical with the exception of the brake itself. In this form of the invention the brake lever 13 is pivotally connected at its lower end, as indicated at 60 and a link is adjustably interconnected with the brake lever 13 and a lever 61 of an air brake valve 62, as indicated at 63.

The operation of this form of the invention is identical with that above described with the exception that instead of operating upon the master cylinder 19 of a hydraulic brake system, the forward movement of the brake lever 13 will cause a like forward movement of the link 63 to thus move the arm 61 to cause the functioning of the air brake valve 62 in conventional manner.

While but two forms of the invention have been shown and described herein, it will be readily apparent to those skilled in the art that many minor modifications may be made without departing from the spirit of the invention or the scope of the appended claims.

What is claimed is:

1. An apparatus of the character described comprising in combination, vehicle floor boards, a brake lever pivotally connected with the floor boards at its lower end and having an arcuate arm extending through the floor boards, a yoke affixed to the free end of the arcuate arm, an accelerator pedal pivoted to said yoke and extending upwardly therefrom a brake pedal pivoted to said yoke and extending downwardly therefrom, means connected with the accelerator pedal for controlling the fuel supply to a motor, automatic means associated with the brake lever for returning the motor to idling condition upon forward movement of said brake lever and means for causing the brake pedal to remain in the same plane with the accelerator pedal upon depression of the latter, said means for controlling the fuel supply including a bracket attached to the underside of the floor boards, a throttle lever, a throttle arm pivoted to said bracket and connected with said throttle lever, an arm pivoted at its lower end to the base of the throttle arm and adapted to bear against the forward side of said throttle arm, a spring for urging the rearward movement of the arm pivoted to the throttle arm and a link extending through the floor boards and interconnecting the upper end of the arm pivoted to the throttle arm and the upper underside of the accelerator pedal.

2. An apparatus of the character described comprising, in combination, vehicle floor boards, a brake lever pivotally connected with the floor boards at its lower end and having an arcuate arm extending through the floor boards, a yoke affixed to the free end of the arcuate arm, an accelerator pedal pivoted to said yoke and extending upwardly therefrom, a brake pedal pivoted to said yoke and extending downwardly therefrom, means connected with the accelerator pedal for controlling the fuel supply to a motor, automatic means associated with the brake lever for returning the motor to idling condition upon forward movement of said brake lever and means for causing the brake pedal to remain in the same plane with the accelerator pedal upon depression of the latter, said means for controlling the fuel supply including a bracket attached to the underside of the floor boards, a throttle lever, a throttle arm pivoted to said bracket and connected with said throttle lever, an arm pivoted at its lower end to the base of the throttle arm and adapted to bear against the forward side of said throttle arm, a spring for urging the rearward movement of the arm pivoted to the throttle arm and a link extending through the floor boards and interconnecting the upper end of the arm pivoted to the throttle arm and the upper underside of the accelerator pedal, said automatic means for returning the motor to idling condition including a bell crank lever having an upwardly extending arm, a roller mounted upon the downwardly extending arm and in contact with the upper end of the brake lever and a detent formed at the free end of the upwardly extending arm and adapted to move the throttle arm rearwardly when the brake lever is moved forwardly.

PAUL C. MORRIS.

REFERENCES CITED

The following references are of record in the file of this patent:

UNITED STATES PATENTS

| Number | Name | Date |
|---|---|---|
| 1,230,426 | Murray | June 19, 1917 |
| 1,473,984 | Baihle | Nov. 13, 1923 |
| 1,550,550 | McCauley | Aug. 18, 1925 |
| 2,200,685 | Anderson | May 14, 1940 |
| 2,279,458 | Harkness | Apr. 14, 1942 |